US011379901B2

(12) United States Patent
Min et al.

(10) Patent No.: US 11,379,901 B2
(45) Date of Patent: Jul. 5, 2022

(54) METHODS AND APPARATUSES FOR DEEP LEARNING-BASED RECOMMENDATION, ELECTRONIC DEVICES, AND MEDIA

(71) Applicant: BEIJING SENSETIME TECHNOLOGY DEVELOPMENT CO., LTD, Beijing (CN)

(72) Inventors: Zhiyu Min, Beijing (CN); Dahua Lin, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 308 days.

(21) Appl. No.: 16/453,553

(22) Filed: Jun. 26, 2019

(65) Prior Publication Data

US 2019/0347708 A1 Nov. 14, 2019

Related U.S. Application Data

(63) Continuation of application No. PCT/CN2018/117690, filed on Nov. 27, 2018.

(30) Foreign Application Priority Data

Jan. 10, 2018 (CN) ......................... 201810024218.9

(51) Int. Cl.

*G06Q 30/06* (2012.01)
*G06N 20/00* (2019.01)
*H04L 67/306* (2022.01)

(52) U.S. Cl.

CPC ......... *G06Q 30/0631* (2013.01); *G06N 20/00* (2019.01); *H04L 67/306* (2013.01)

(58) Field of Classification Search

CPC ... H04L 67/306; G06N 20/00; G06Q 30/0631

(Continued)

(56) References Cited

U.S. PATENT DOCUMENTS 10,089,675 B1 * 10/2018 Rastogi ................ G06Q 10/067
11,004,135 B1 * 5/2021 Sandler .................... G06N 3/08

(Continued)

FOREIGN PATENT DOCUMENTS

CN 101625734 A 1/2010
CN 101694652 A 4/2010

(Continued)

OTHER PUBLICATIONS

Third Office Action of the Chinese application No. 201810024218.9, dated Oct. 30, 2020.

(Continued)

*Primary Examiner* — Alan S Chou
(74) *Attorney, Agent, or Firm* — Syncoda LLC; Feng Ma

(57) ABSTRACT

Methods and apparatuses for deep learning-based recommendation, electronic devices, and media include: respectively obtaining related information of a target user and related information of a target item; respectively using at least two sub-models in an integrated model to obtain, based on the related information of the target user and the related information of the target item, operating probabilities corresponding to the at least two sub-models; obtaining, based on the operating probabilities corresponding to the at least two sub-models, a target probability about the target user operating the target item; and recommending the target item to the target user based on the target probability.

18 Claims, 5 Drawing Sheets

(58) Field of Classification Search
USPC .......................................................... 705/26.7
See application file for complete search history.

(56) References Cited

U.S. PATENT DOCUMENTS

| | | | | |
|---|---|---|---|---|
| 2016/0110794 | A1* | 4/2016 | Hsiao | G06K 9/00677 705/26.7 |
| 2016/0259857 | A1 | 9/2016 | Wang et al. | |
| 2016/0371589 | A1* | 12/2016 | Golbandi | G06N 5/04 |
| 2017/0103343 | A1* | 4/2017 | Yee | G06N 7/005 |
| 2017/0213156 | A1 | 7/2017 | Hammond et al. | |
| 2017/0293695 | A1* | 10/2017 | Brovman | G06Q 30/0631 |
| 2018/0157759 | A1* | 6/2018 | Zheng | G06Q 50/01 |
| 2018/0174070 | A1* | 6/2018 | Hoffman | G06T 11/00 |
| 2018/0308149 | A1* | 10/2018 | Guo | G06Q 30/0631 |
| 2019/0138656 | A1* | 5/2019 | Yang | G06F 16/9535 |
| 2019/0163710 | A1* | 5/2019 | Haghighat Kashani | G06N 20/00 |
| 2020/0104288 | A1* | 4/2020 | Tao | G06N 20/00 |
| 2021/0117757 | A1* | 4/2021 | Wilson | G06Q 30/02 |

FOREIGN PATENT DOCUMENTS

| | | | |
|---|---|---|---|
| CN | 103366177 | A | 10/2013 |
| CN | 103631753 | A | 3/2014 |
| CN | 104699711 | A | 6/2015 |
| CN | 104915423 | A | 9/2015 |
| CN | 106445977 | A | 2/2017 |
| CN | 106649774 | A | 5/2017 |
| CN | 107273438 | A | 10/2017 |
| CN | 107437111 | A | 12/2017 |
| CN | 108268934 | A | 7/2018 |

OTHER PUBLICATIONS

Survey of Matrix Factorization Based Recommendation Methods by Integrating Social Information / Liu, Huafeng et al., / Journal of Software, published on Oct. 9, 2017.

Min, Z; and Lin, D. 2018. Probabilistic ensemble of collaborative filters. To appear in AAAI 2018.

Wang, H.; Wang, N.; and Yeung, D.-Y. 2015. Collaborative deep learning for recommender systems. In Proceedings of the 21th ACM SIGKDD International Conference on Knowledge Discovery and Data Mining, 1235-1244. ACM.

Zheng, L.; Noroozi, V.; and Yu, P. S. 2017. Joint deep modeling of users and items using reviews for recommendation. In Proceedings of the Tenth ACM International Conference on Web Search and Data Mining, 425-434. ACM.

Beutel, A.; Ahmed, A.; and Smola, A. J. 2015. Accams: Additive co-clustering to approximate matrices succinctly. In Proceedings of the 24th International Conference on World Wide Web, 119-129. ACM.

Hu, Y.; Koren, Y.; and Volinsky, C. 2008. Collaborative filtering for implicit feedback datasets. In Proceedings of the 2008 Eighth IEEE International Conference on Data Mining, 263-272. IEEE Computer Society.

International Search Report in the international application No. PCT/CN2018/117690, dated Feb. 27, 2019.

Second Office Action of the Chinese application No. 201810024218.9, dated Jun. 2, 2020.

Xu, Ri et al. "Adaboost-Based Framework For Rating Prediction in Recommender System", Application of Computer System, Aug. 15, 2017, vol. 26, Issue No. 8, p. 111-108.

* cited by examiner

METHODS AND APPARATUSES FOR DEEP LEARNING-BASED RECOMMENDATION, ELECTRONIC DEVICES, AND MEDIA

CROSS-REFERENCE TO RELATED APPLICATIONS

This is a continuation of International patent application No. PCT/CN2018/117690 filed on Nov. 27, 2018, which claims priority to Chinese Patent Application No. 201810024218.9 filed on Jan. 10, 2018. The disclosures of these applications are incorporated herein by reference in their entirety.

TECHNICAL FIELD

The present disclosure relates to Internet technologies, and in particular, to methods and apparatuses for deep learning-based recommendation, electronic devices, media, and programs.

BACKGROUND

Recommendation systems have become the core of e-commerce and many online sharing services, and technically, the recommendation systems are generally generated based on content or collaborative filtering. In the aspect of the content, the recommendation systems are mainly based on characteristics of items, and in the aspect of the collaborative filtering, the recommendation systems are based on users having similar histories; in practical application, the collaborative filtering has already shown great performance.

SUMMARY

Embodiments of the present disclosure provide deep learning-based recommendation technologies.

According to one aspect of embodiments of the present disclosure, provided is a method for deep learning-based recommendation, including: respectively obtaining related information of a target user and related information of a target item; respectively using at least two sub-models in an integrated model to obtain, based on the related information of the target user and the related information of the target item, operating probabilities corresponding to the at least two sub-models, the operating probability being used for indicating a probability, obtained based on one sub-model, about the target user operating the target item, and the integrated model including at least two sub-models; obtaining, based on the operating probabilities corresponding to the at least two sub-models, a target probability about the target user operating the target item; and recommending the target item to the target user based on the target probability.

According to another aspect of the embodiments of the present disclosure, provided is an apparatus for deep learning-based recommendation, including: an information obtaining unit, configured to respectively obtain related information of a target user and related information of a target item; a probability obtaining unit, configured to respectively use at least two sub-models in an integrated model to obtain, based on the related information of the target user and the related information of the target item, operating probabilities corresponding to the at least two sub-models, the operating probability being used for indicating a probability, obtained based on one sub-model, about the target user operating the target item, and the integrated model including at least two sub-models; a probability synthesis unit, configured to obtain, based on the operating probabilities corresponding to the at least two sub-models, a target probability about the target user operating the target item; and a recommending unit, configured to recommend the target item to the target user based on the target probability.

According to another aspect of the embodiments of the present disclosure, provided is an apparatus for deep learning-based recommendation, including: a processor; and a memory for storing instructions executable by the processor, wherein the processor is configured to: obtain related information of a target user and related information of a target item; respectively use at least two sub-models in an integrated model to obtain, based on the related information of the target user and the related information of the target item, operating probabilities corresponding to the at least two sub-models, wherein the operating probability is used for indicating a probability, obtained based on one sub-model, about the target user operating the target item, and the integrated model comprises at least two sub-models; obtain, based on the operating probabilities corresponding to the at least two sub-models, a target probability about the target user operating the target item; and recommend the target item to the target user based on the target probability.

According to another aspect of the embodiments of the present disclosure, provided is an electronic device, including a processor, where the processor includes the apparatus for deep learning-based recommendation.

According to another aspect of embodiments of the present disclosure, provided is an electronic device, including a memory configured to store an executable instruction; and a processor configured to communicate with the memory to execute the executable instruction so as to complete operations of the method for deep learning-based recommendation as stated above.

According to another aspect of the embodiments of the present disclosure, provided is a non-transitory computer storage medium, having stored thereon instructions that, when executed by a processor, cause the processor to perform operations of the method for deep learning-based recommendation as stated above.

According to another aspect of the embodiments of the present disclosure, provided is a computer program, including computer-readable codes, where when the computer-readable codes run in a device, a processor in the device executes instructions for implementing the method for deep learning-based recommendation as stated above.

Based on the methods and apparatuses deep learning-based recommendation, electronic devices, media, and programs provided by the embodiments of the present disclosure, related information of a target user and related information of a target item are respectively obtained; at least two sub-models in an integrated model are respectively used to obtain, based on the related information of the target user and the related information of the target item, operating probabilities corresponding to the at least two sub-models; the operating probabilities are respectively obtained by means of the integrated at least two sub-models, then a target probability about the target user operating the target item is obtained based on the at least two operating probabilities, and by means of the complementarity between the at least two sub-models, different data distributions that the at least two sub-models specialize are complemented, and the obtained probability value may more accurately predict the probability about the target user clicking the target item; and the target item is recommended to the target user based on the target probability.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

With reference to the drawings, according to the detailed description, the present disclosure can be understood more clearly, where.

DETAILED DESCRIPTION

Figure 1:
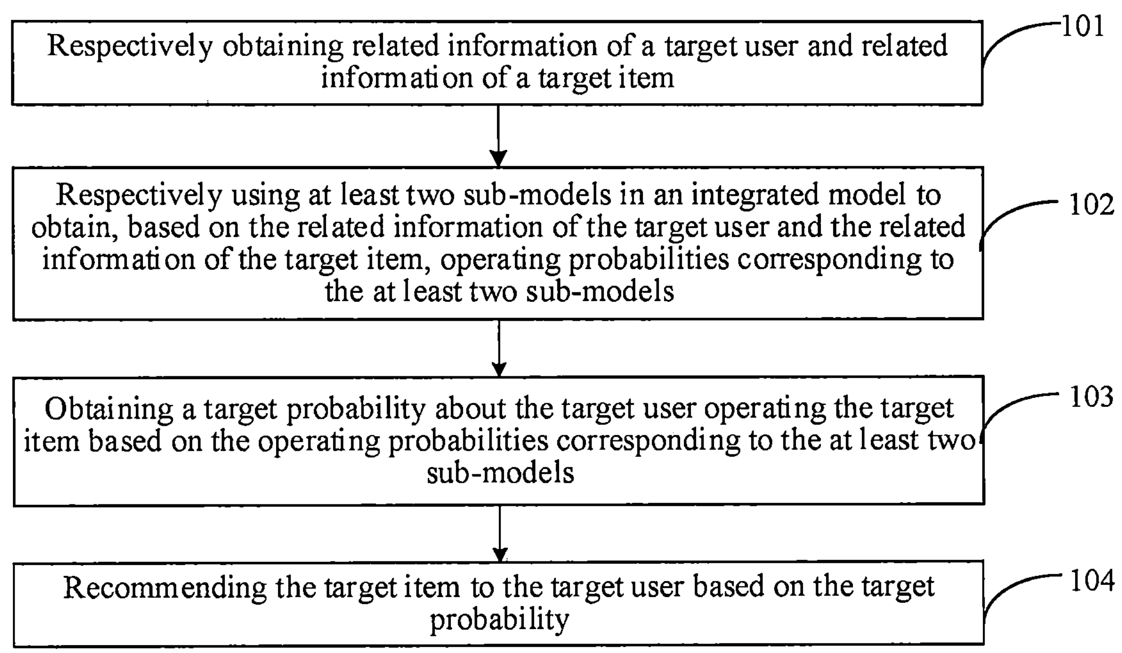
FIG. 1 is a flowchart of one embodiment of a method for deep learning-based recommendation according to the present disclosure.

Each exemplary embodiment of the present disclosure is described in detail with reference to the accompany drawings now. It should be noted that, unless otherwise stated, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

FIG. 1 is a flowchart of one embodiment of a method for deep learning-based recommendation according to the present disclosure. As shown in FIG. 1, the method of this embodiment includes the following operations.

In operation 101, related information of a target user and related information of a target item are obtained.

The related information includes one or more of information related to an operation of the user, or information related to an operated item.

In one or more embodiments, the related information of the target user may include, but is not limited to: history information about a historical item being operated by the target user, the historical item including at least one item operated by the target user; the related information of the target item may include, but is not limited to: history information about the target item being operated by a historical user, the historical user including at least one user who operated the target item. According to this embodiment, an item which a user is interested in may be recommended to the user by merely using historical operation information of the user and historical information of the item being operated, without a need for acquiring attribute information of the user and the item, and the like, and thus the information processing process is simplified, and the recommendation speed is improved.

According to one or more embodiments of the present disclosure, in a certain website (for example, a video website or a shopping website), when there is a need for recommending an item (for example, a commodity or a video) to a target user, there may be two circumstances: on the one hand, the target user may be an old user of the website (who carried out operations of clicking some items in the website before), at this time, a target item recommended to the target user may be an item which was operated by the target user according to types of items, shopping habits of the user, and the like, or an item which is not operated by the target user, and at this time, historical operation information of the target user is required to be obtained; on the other hand, the target user may be a new user of the website (who does not carry out any operation of clicking an item in the website before), an item which was operated by another user in the website may be recommended to the target user, and at this time, historical operation information of the target item is required to be obtained.

In an example, the operation 101 may be executed by a processor by invoking a corresponding instruction stored in a memory, or may be executed by an information obtaining unit 41 run by the processor.

In operation 102, at least two sub-models in an integrated model are respectively used to obtain, based on the related information of the target user and the related information of the target item, operating probabilities corresponding to the at least two sub-models.

The operating probability is used for indicating a probability, obtained based on one sub-model, about the target user operating the target item, and the integrated model includes at least two sub-models; the integrated model is obtained by training, the training on the integrated model is based on a relation between the at least two sub-models, and the operating probabilities can respectively be obtained by means of the at least two trained sub-models.

In an example, the operation 102 may be executed by a processor by invoking a corresponding instruction stored in a memory, or may be executed by a probability obtaining unit 42 run by the processor.

In operation 103, a target probability about the target user operating the target item is obtained based on the operating probabilities corresponding to the at least two sub-models.

According to one or more embodiments of the present disclosure, based on a relation between the at least two trained sub-models, for example, weights corresponding to the at least two sub-models, the operating probabilities obtained based on the at least two sub-models are combined in combination with the weights to obtain the target probability; and based on integration of multiple sub-models, accuracy of the integrated model is enhanced.

In an example, the operation 103 may be executed by a processor by invoking a corresponding instruction stored in a memory, or may be executed by a probability synthesis unit 43 run by the processor.

In operation 104, the target item is recommended to the target user based on the target probability.

In an example, the operation 104 may be executed by a processor by invoking a corresponding instruction stored in a memory, or may be executed by a recommending unit 44 run by the processor.

Based on the method for deep learning-based recommendation provided by the embodiment above of the present disclosure, a target user and a target item are received to respectively obtain related information of the target user and related information of the target item; at least two sub-models in an integrated model are respectively used to obtain, based on the related information of the target user and the related information of the target item, operating probabilities corresponding to the at least two sub-models; the operating probabilities are respectively obtained by means of the integrated at least two sub-models, then a target probability about the target user operating the target item is obtained based on the at least two operating probabilities, and by means of the complementarity between the at least two sub-models, different data distributions that the at least two sub-models specialize are complemented, and the obtained probability value may more accurately predict the probability about the target user clicking the target item; and the target item is recommended to the target user based on the target probability.

In another embodiment based on the method for deep learning-based recommendation of the present disclosure, based on at least one embodiment as stated above, the operation 102 includes:

using the sub-models to respectively vectorize the related information of the target user and the related information of the target item, thereby obtaining user vectors and item vectors; and obtaining the operating probabilities based on the user vectors and the item vectors. According to one or more embodiments of the present disclosure, dot products of the user vectors and the item vectors are calculated to obtain operate values, and the operating probabilities are obtained based on the operate values.

According to one or more embodiments of the present disclosure, the sub-models in this embodiment may be implemented by means of Weighted Matrix Factorization (WMF). In order to achieve probability calculation, the related information of the target user and the related information of the target item are respectively vectored by means of the trained sub-model, the dimensionality of vectorization is decided by means of the trained sub-models, and the user vectors and the item vectors after vectorization satisfy the requirement for executing the dot product operation; by calculating the dot products of the user vectors and the item vectors, the operate values are obtained, and at this time, the operate values are numerical values; in order to obtain the probability values, the operate values may be subjected to processing such as normalization so as to obtain the operating probabilities.

In another embodiment based on the method for deep learning-based recommendation of the present disclosure, based on at least one embodiment as stated above, the operation 103 includes:

respectively calculating products of the operating probabilities and model weight values of the sub-models corresponding to the operating probabilities, each model weight value corresponding to one sub-model; and adding the products corresponding to the at least two operating probabilities to obtain the target probability about the target user operating the target item.

According to one or more embodiments of the present disclosure, an appropriate model weight value is allocated to each sub-mode by means of training, the proportion of the operating probability obtained by each sub-model in the total target probability is controlled by means of the model weight value, and the higher the weight value is, the greater effect the sub-model may have on item recommendation.

In one or more embodiments, the operation 104 may include:

in response to the target probability being greater than or equal to a preset threshold, recommending the target item corresponding to the target probability to the target user; and in response to the target probability being less than a preset threshold, recommending no target item corresponding to the target probability to the target user.

In the method for deep learning-based recommendation in this embodiment, the final purpose is to recommend to a user a target item which the target user may be more interested in; therefore, when the target probability is greater than or equal to the preset threshold, it indicates that the probability about the target user clicking the target item is greater than or equal to the preset threshold, and recommending the target item to the target user may effectively improve the operation probability of user, thereby achieving the purpose of effective recommendation.

Figure 2:
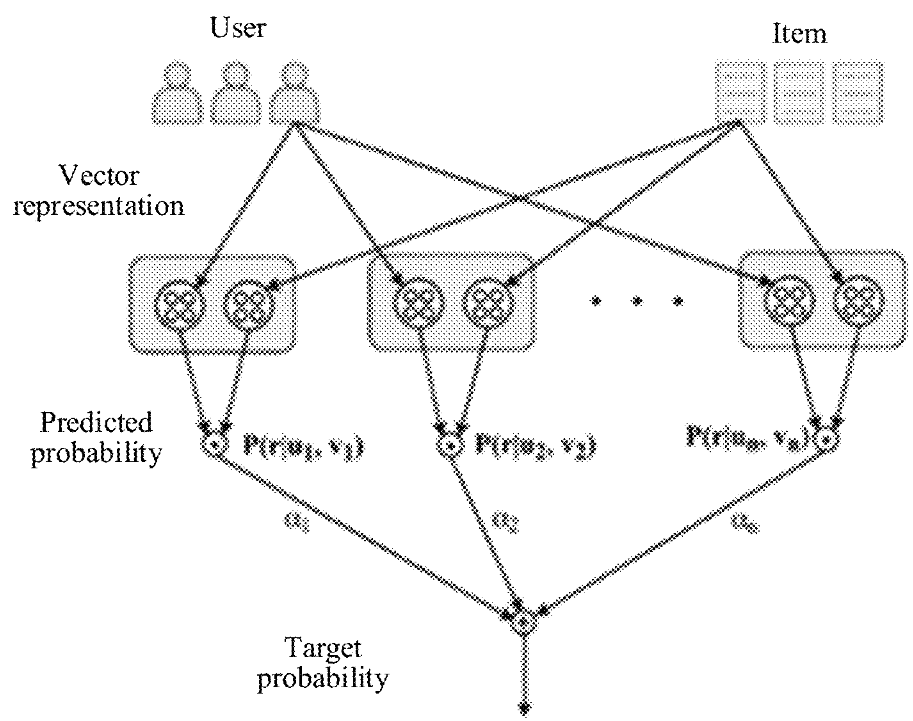
FIG. 2 is a schematic diagram of one example of a method for deep learning-based recommendation according to the present disclosure.

FIG. 2 is a schematic diagram of one example of a method for deep learning-based recommendation according to the present disclosure. As shown in FIG. 2, each of users corresponds to a vector representation, i.e., an embedding, in each sub-model, and similarly, each of the items also corresponds to an embedding in each sub-model. An inner product of vectors corresponding to a pair of a user and an item is a predicted probability (i.e., a prediction) provided by a current sub-model, which is represented as $P(r|u_1, v_1)$, $P(r|u_2, v_2), \ldots, P(r|u_n, v_n)$ in the drawing; a final target probability (final prediction) can be obtained by means of weight addition of the probabilities of the multiple sub-models; in the drawing, $\alpha_1, \alpha_2, \ldots, \alpha_n$ respectively represent the model weight values corresponding to each sub-model, and the target probability is obtained by weighted addition in combination with the predicted probabilities obtained by the sub-models and the model weight values.

In another embodiment based on the method for deep learning-based recommendation of the present disclosure, based on at least one embodiment as stated above, the method further includes:

training the integrated model based on a historical user and a historical item, where a historical probability about the historical user operating the historical item is known.

In one or more embodiments, in order to obtain a more accurate target probability, before the integrated model is applied, the integrated model is required to be trained; information used in training is historical users and historical items based on known operation information, and by analyzing the operation information of the historical users and the historical items, one or more newly added items may be recommended to any user in the historical users, and/or any of one or more historical items may be recommended to one or more new users.

In an example of the at least one embodiment above of the method for deep learning-based recommendation of the present disclosure, the training the integrated model based on a historical user and a historical item includes:

establishing a historical vector corresponding to the historical user and the historical item based on the historical user and the historical item;

decomposing the historical vector using the integrated model to obtain at least one sample user vector and at least one sample item vector;

obtaining a predicted probability based on the sample user vector and the sample item vector, the predicted probability indicating the probability about the historical user operating the historical item predicted by the integrated model; and training the integrated model based on the predicted probability and the historical probability.

In this embodiment, because the operation information of the historical user and the historical item is known, a matrix vector may be established based on which historical item the historical operated and based on which historical user the historical item is operated by; by taking the historical user as the abscissa (or the ordinate) and taking the historical item as the ordinate (or the abscissa), a value exists between the historical user and the historical item which have an operation relation, and the magnitude of the value is decided by the operation information. The value between the historical user and the historical item which do not have any operation relation may be set as 0.

In an example of the at least one embodiments above of the method for deep learning-based recommendation of the present disclosure, the decomposing the historical vector using the integrated model to obtain at least one sample user vector and at least one sample item vector, and obtaining a predicted probability based on the sample user vector and the sample item vector includes:

decomposing the historical vector using an initial integrated model to obtain at least one sample user vector and at least one sample item vector, the initial integrated model including one sub-model; and calculating a dot product of the sample user vector and the sample item vector using the initial integrated model to obtain a predicted value about the historical user clicking the historical item, and obtaining the predicted probability based on the predicted value.

According to one or more embodiments of the present disclosure, the process of training the integrated model is training the sub-models one by one, and the initial integrated model merely includes one sub-model; the sub-model is trained, and different data weight values are allocated, based on the obtained predicted probability and the known historical probability, to data for training the integrated model; a new integrated model obtained after one sub-model is added is trained according to the historical users and the historical items to which different data weight values are allocated, and then new data weight values are allocated based on the new predicted probability, and so forth in an iterative manner; data weight values are reallocated to the historical users and the historical items each time until convergence is achieved. Moreover, there is no need to restrict the number of iterations in advance in this embodiment, and the training can be carried out until convergence of the integrated model is achieved, or computing resources are used out. Usually, a relatively good effect can be obtained after the first few iterations in this embodiment.

Figure 3:
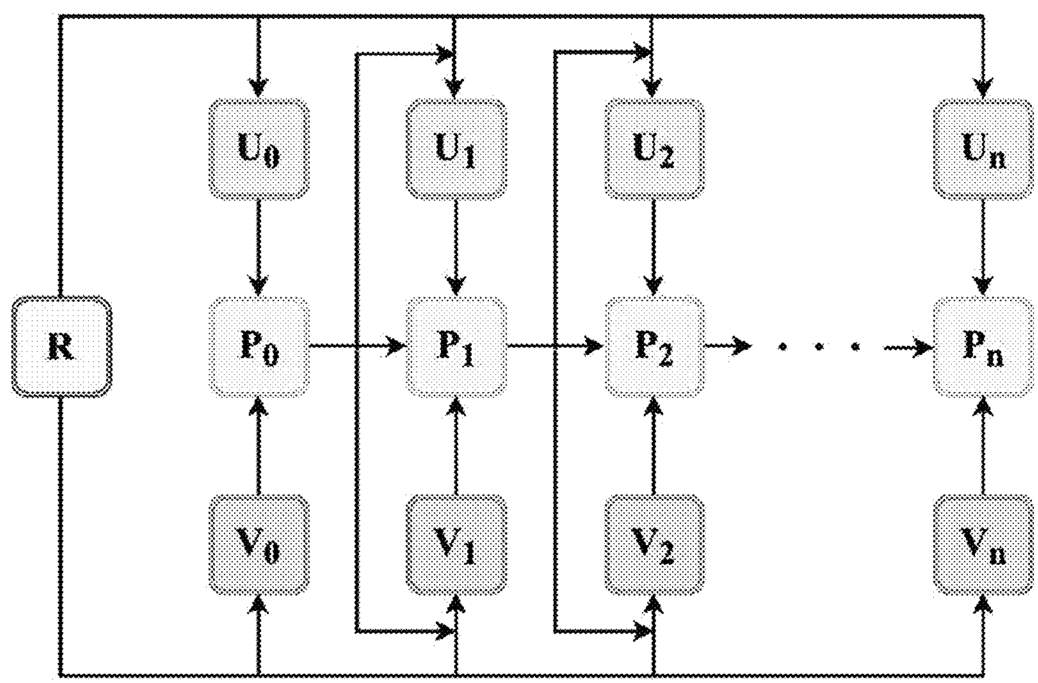
FIG. 3 is a schematic diagram of one example of training an integrated model in a method for deep learning-based recommendation according to the present disclosure.

FIG. 3 is a schematic diagram of one example of training an integrated model in a method for deep learning-based recommendation according to the present disclosure. As shown in FIG. 3, input in this example is operation information of all the historical users and all the historical items, so as to obtain historical vectors (represented as R in FIG. 3); output is vectors (embedding) (represented as U and V in FIG. 3) obtained by decomposition of the integrated model on the users and the items, and a final predicted probability (represented as P in FIG. 3, including: P0, P1, . . . , Pn); in each turn of iterative training, the probabilities given by the integrated model are compared with an original evaluation matrix R, a higher weight is given to the predicted probability with a greater error, and a new sub-model is trained by using the obtained training weight, i.e., new Ui and Vi; and then the probability given by the new sub-model is added to the integrated P, and so forth in an iterative manner.

In one or more embodiments, the training the integrated model based on the predicted probability and the historical probability includes:

allocating, according to a difference between the predicted probability and the historical probability, data weight values for the historical user and the historical item corresponding to the predicted probability, where the greater the difference is, the greater the data weight values are; and iteratively training the integrated model based on the sample user vector and the sample item vector combined with the data weight values.

The integrated model is trained based on the data weight value reallocated each time in combination with the sample user vector and the sample item vector, and in each allocation of the data weight value, the historical user and/or historical item having a greater difference is allocated with a greater weight value.

In one or more embodiments, the process of iteratively training the integrated model includes:

adding one sub-model to the initial integrated model to constitute a first integrated model;

calculating, using the first integrated model and in combination with the data weight values, a dot product of the sample user vector and the sample item vector to obtain a first predicted value about the historical user clicking the historical item, and obtaining a first predicted probability based on the first predicted value;

iterative execution: according to a first difference between the first predicted probability and the historical probability, allocating model weight values for the at least two sub-models in the first integrated model based on the first difference, and allocating first data weight values for the historical user and the historical item corresponding to the first predicted probability based on the first difference; and adding one sub-model to the first integrated model to constitute a second integrated model to substitute the first integrated model, using the second integrated model as the first integrated model, calculating, using the first integrated model and in combination with the first data weight values, a dot product of the sample user vector and the sample item vector to obtain a first predicted value about the historical user clicking the historical item, and obtaining a first predicted probability based on the first predicted value until satisfying a preset convergence condition.

According to one or more embodiments of the present disclosure, in the process of iteratively training the integrated model, the process of each iteration may be represented by means of formula (1):

$$p_\alpha(r|i,j)=(1-\alpha)p(r|i,j)+\alpha p'(r|i,j) \quad \text{Formula (1)}$$

where $p_\alpha(r|i,j)$ is the predicted probability outputted by the integrated model after the latest combination; $p_\alpha(r|i,j)$ is the predicted probability outputted by the current integrated model (the probability that the number of times user i operating item j is r); $(1-\alpha)$ is the model weight corresponding to the current integrated model; $p'(r|i,j)$ is the predicted probability outputted by the newly added sub-model; a is the model weight corresponding to the newly added sub-model. For example, when the current integrated model is the initial integrated model, the integrated model after the latest combination is a first integrated model; and when the current integrated model is the first integrated model, the integrated model after the latest combination is a second integrated model.

In each iterative training, in addition to adjusting the model weight of the sub-model, the data weight corresponding to the historical user and the historical item is further adjusted according to the difference between the predicted probability and the historical probability, and the calculation formula for the data weight is as shown in formula (2):

$$\rho_{ij} = \frac{\alpha\overline{P}}{\alpha\overline{P} + (1-\alpha)P(r \mid i, j)} \quad \text{Formula (2)}$$

where $\rho_{ij}$ is the data weight; $\overline{P}=\iint p'(r|u,v)p_0(u)p_0(v)dudv$ represents the integration of $p'(r|u,v)$, where i and j are serial numbers, indicating the i-th user and the j-th item, u is the vector corresponding to the user, v is the vector corresponding to the item, and according to the formula of integration of $\overline{P}$, it can be derived that $\overline{P}=p'(r|i,j)$. Therefore, formula (2) may be converted in to formula (3):

$$\rho_{ij}=1/(1+\gamma p(r|i,j)) \quad \text{Formula (3)}$$

where $$\gamma = \frac{1-\alpha}{\alpha\overline{P}}$$

is a set parameter. Therefore, the magnitude of the data weight is decided based on the current integrated model, and the data weight changes as the integrated model changes.

According to one or more embodiments of the present disclosure, the satisfying a preset convergence condition includes:

the first difference between the first predicted probability and the historical probability obtained in the iterative process is less than a preset difference. The preset convergence condition may further include that all the calculation resources are used out.

Any method for deep learning-based recommendation provided by the embodiments of the present disclosure is executed by any appropriate device having data processing capability, including, but not limited to, a terminal device and a server. Alternatively, any method for deep learning-based recommendation provided in the embodiments of the present disclosure is executed by a processor, for example, any image processing method mentioned in the embodiments of the present disclosure is executed by the processor by invoking a corresponding instruction stored in a memory. Details are not described below again.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing a program code such as an ROM, an RAM, a magnetic disk, or an optical disk.

Figure 4:
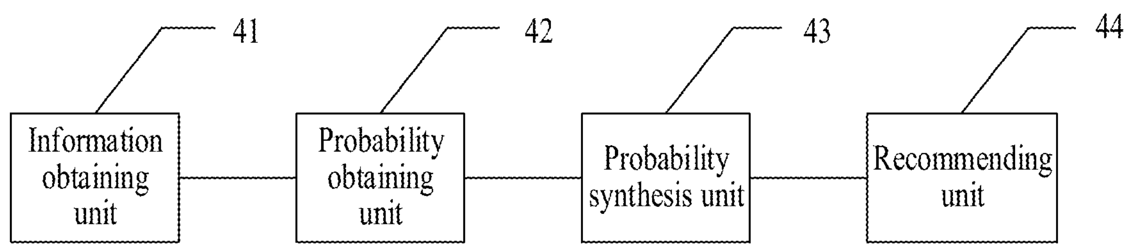
FIG. 4 is a schematic structural diagram of one embodiment of an apparatus for deep learning-based recommendation according to the present disclosure.

FIG. 4 is a schematic structural diagram of one embodiment of an apparatus for deep learning-based recommendation according to the present disclosure. The apparatus of this embodiment is used for implementing at least one of the foregoing embodiments of the method according to the present disclosure. As shown in FIG. 4, the apparatus of this embodiment includes:

an information obtaining unit 41, configured to respectively obtain related information of a target user and related information of a target item.

The related information includes one or more pieces of information used for describing information related to an operation of the user, or information related to an operated item.

In one or more embodiments, the related information of the target user may include, but is not limited to: history information about a historical item being operated by the target user, the historical item including at least one item operated by the target user; the related information of the target item may include, but is not limited to: history information about the target item being operated by a historical user, the historical user including at least one user who operated the target item. According to this embodiment, an item which a user is interested in may be recommended to the user by merely using historical operation information of the user and historical information of the item being operated, without a need for acquiring attribute information of the user and the item, and the like, and thus the information processing process is simplified, and the recommendation speed is improved.

A probability obtaining unit 42, configured to respectively use at least two sub-models in an integrated model to obtain, based on the related information of the target user and the related information of the target item, operating probabilities corresponding to the at least two sub-models, where the operating probability is used for indicating a probability, obtained based on one sub-model, about the target user operating the target item, and the integrated model includes at least two sub-models; the integrated model is obtained by training a relation between the at least two sub-models;

a probability synthesis unit 43, configured to obtain, based on the operating probabilities corresponding to the at least two sub-models, a target probability about the target user operating the target item; and a recommending unit 44, configured to recommend the target item to the target user based on the target probability.

Based on the apparatus for deep learning-based recommendation provided by the embodiment above of the present disclosure, a target user and a target item are received to respectively obtain related information of the target user and related information of the target item; at least two sub-models in an integrated model are respectively used to obtain, based on the related information of the target user and the related information of the target item, operating probabilities corresponding to the at least two sub-models; the operating probabilities are respectively obtained by means of the integrated at least two sub-models, then a target probability about the target user operating the target item is obtained based on the at least two operating probabilities, and by means of the complementarity between the at least two sub-models, different data distributions that the at least two sub-models specialize are complemented, and the obtained probability value may more accurately predict the probability about the target user clicking the target item; and the target item is recommended to the target user based on the target probability.

In another embodiment based on the apparatus for deep learning-based recommendation of the present disclosure, based on at least one embodiment as stated above, the probability obtaining unit 42 includes:

a vectorization module, configured to use the sub-models to respectively vectorize the related information of the target user and the related information of the target item, thereby obtaining user vectors and item vectors; and an operating probability module, configured to obtain the operating probabilities based on the user vectors and the item vectors.

According to one or more embodiments of the present disclosure, the sub-models in this embodiment may be implemented by means of Weighted Matrix Factorization (WMF). In order to achieve probability calculation, the related information of the target user and the related information of the target item are respectively vectored by means of the trained sub-model, the dimensionality of vectorization is decided by means of the trained sub-models, and the user vectors and the item vectors after vectorization satisfy the requirement for executing the dot product operation; by calculating the dot products of the user vectors and the item vectors, the operate values are obtained, and at this time, the operate values are numerical values; in order to obtain the probability values, the operate values may be subjected to processing such as normalization so as to obtain the operating probabilities.

According to one or more embodiments of the present disclosure, the operating probability module is configured to calculate dot products of the user vectors and the item vectors to obtain operate values, and obtain the operating probabilities based on the operate values.

In another embodiment based on the apparatus for deep learning-based recommendation of the present disclosure, based on at least one embodiment as stated above, the probability synthesis unit 43 is configured to respectively calculate products of the operating probabilities and model weight values of the sub-models corresponding to the operating probabilities, each model weight value corresponding to one sub-model; and add the products corresponding to the at least two operating probabilities to obtain the target probability about the target user operating the target item.

According to one or more embodiments of the present disclosure, an appropriate model weight value is allocated to each sub-mode by means of training, the proportion of the operating probability obtained by each sub-model in the total target probability is controlled by means of the model weight value, and the higher the weight is, the greater effect the sub-model may have on item recommendation.

In one or more embodiments, the recommending unit 44 is configured to:

in response to the target probability being greater than or equal to a preset threshold, recommend the target item corresponding to the target probability to the target user; and in response to the target probability being less than a preset threshold, recommend no target item corresponding to the target probability to the target user.

In another embodiment based on the apparatus for deep learning-based recommendation of the present disclosure, based on at least one embodiment as stated above, the apparatus further includes:

a training unit, configured to train the integrated model based on a historical user and a historical item, where a historical probability about the historical user operating the historical item is known.

In one or more embodiments, in order to obtain a more accurate target probability, before the integrated model is applied, the integrated model is required to be trained; information used in training is historical users and historical items based on known operation information, and by analyzing the operation information of the historical users and the historical items, one or more newly added items may be recommended to any user in the historical users, and/or any of one or more historical items may be recommended to one or more new users.

In an example of the at least one embodiment above of the apparatus for deep learning-based recommendation of the present disclosure, the training unit includes:

a vector module, configured to establish a historical vector corresponding to the historical user and the historical item based on the historical user and the historical item;

a decomposing module, configured to decompose the historical vector using the integrated model to obtain at least one sample user vector and at least one sample item vector;

probability predicting module, configured to obtain a predicted probability based on the sample user vector and the sample item vector, the predicted probability indicating the probability about the historical user operating the historical item predicted by the integrated model; and a model training module, configured to train the integrated model based on the predicted probability and the historical probability.

In this embodiment, because the operation information of the historical user and the historical item is known, a matrix vector may be established based on which historical item the historical operated and based on which historical user the historical item is operated by; by taking the historical user as the abscissa (or the ordinate) and taking the historical item as the ordinate (or the abscissa), a value exists between the historical user and the historical item which have an operation relation, and the magnitude of the value is decided by the operation information. The value between the historical user and the historical item which do not have any operation relation may be set as 0.

In an example of the at least one embodiment above of the apparatus for deep learning-based recommendation of the present disclosure, the decomposing module is configured to decompose the historical vector using an initial integrated model to obtain at least one sample user vector and at least one sample item vector, the initial integrated model including one sub-model.

In an example of the at least one embodiments above of the apparatus for deep learning-based recommendation of the present disclosure, the probability predicting module is configured to calculate a dot product of the sample user vector and the sample item vector using the initial integrated model to obtain a predicted value about the historical user clicking the historical item, and obtain the predicted probability based on the predicted value.

In an example of the at least one embodiment above of the apparatus for deep learning-based recommendation of the present disclosure, the model training module includes:

a weight allocation module, configured to allocate, according to a difference between the predicted probability and the historical probability, data weight values for the historical user and the historical item corresponding to the predicted probability, where the greater the difference is, the greater the data weight values are; and an iterative training module, configured to iteratively train the integrated model based on the sample user vector and the sample item vector combined with the data weight values.

In an example of the at least one embodiment above of the apparatus for deep learning-based recommendation of the present disclosure, the iterative training module is configured to:

add one sub-model to the initial integrated model to constitute a first integrated model;

calculate, using the first integrated model and in combination with the data weight values, a dot product of the sample user vector and the sample item vector to obtain a first predicted value about the historical user clicking the historical item, and obtain a first predicted probability based on the first predicted value;

iterative execution: according to a first difference between the first predicted probability and the historical probability, allocate model weight values for the at least two sub-models in the first integrated model based on the first difference, and allocate first data weight values for the historical user and the historical item corresponding to the first predicted probability based on the first difference; and add one sub-model to the first integrated model to constitute a second integrated model to substitute the first integrated model, use the second integrated model as the first integrated model, calculate, using the first integrated model and in combination with the first data weight values, a dot product of the sample user vector and the sample item vector to obtain a first predicted value about the historical user clicking the historical item, and obtain a first predicted probability based on the first predicted value until satisfying a preset convergence condition.

In one or more embodiments, the satisfying a preset convergence condition includes:

the first difference between the first predicted probability and the historical probability obtained in the iterative process is less than a preset difference.

According to another aspect of the embodiments of the present disclosure, provided is an electronic device, including a processor, where the processor includes the apparatus for deep learning-based recommendation.

An electronic device provided according to one aspect of the embodiments of the present disclosure includes: a memory configured to store an executable instruction; and a processor, configured to communicate with the memory to execute the executable instruction to achieve operations of any embodiment of the method for deep learning-based recommendation of the present disclosure A computer storage medium provided according to one aspect of the embodiments of the present disclosure is configured to store a computer readable instruction, where when the instruction is executed, the operations according to any one of the foregoing embodiments of the method for deep learning-based recommendation of the present disclosure are implemented.

A computer program provided according to one aspect of the embodiments of the present disclosure includes a computer readable code, where when the computer readable code runs on a device, a processor in the device executes an instruction for implementing any of the foregoing embodiments of the method for deep learning-based recommendation of the present disclosure.

Figure 5:
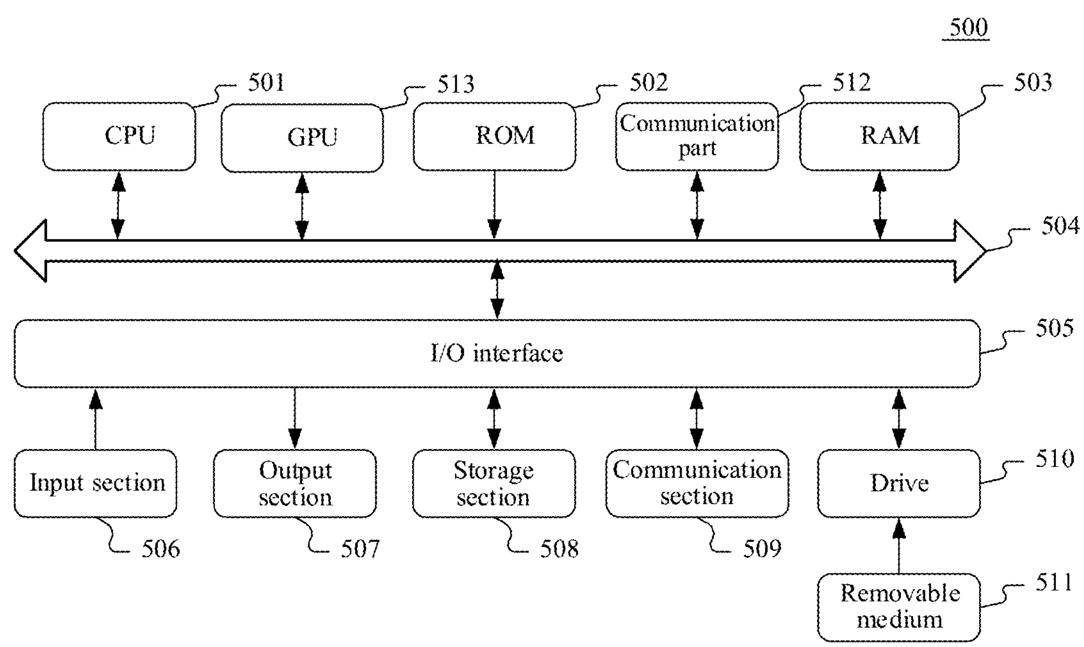
FIG. 5 is a schematic structural diagram of an electronic device for implementing a terminal device or a server in embodiments of the present disclosure.

The embodiments of the present disclosure further provide an electronic device which, for example, may be a mobile terminal, a Personal Computer (PC), a tablet computer, a server, and the like. Referring to FIG. 5 below, a schematic structural diagram of an electronic device 500, which may be a terminal device or a server, suitable for implementing an embodiment of the present disclosure is shown. As shown in FIG. 5, the computer system 500 includes one or more processors, a communication section, and the like. The one or more processors are, for example, one or more Central Processing Units (CPUs) 501 and/or one or more Graphic Processing Units (GPUs) 513, and the processors may execute appropriate actions and processing according to executable instructions stored in a Read-Only Memory (ROM) 502 or executable instructions loaded from a storage part 508 to a Random Access Memory (RAM) 503. The communication part 512 may include, but is not limited to, a network card. The network card may include, but is not limited to, an Infiniband (TB) network card.

The processor may communicate with the ROM 502 and/or the RAM 530 to execute executable instructions, is connected to the communication part 512 by means of a bus 504, and communicates with other target devices by means of the communication part 512, so as to complete corresponding operations of any of the methods provided by the embodiments of the present disclosure, for example, respectively obtaining related information of a target user and related information of a target item; respectively using at least two sub-models in an integrated model to obtain, based on the related information of the target user and the related information of the target item, operating probabilities corresponding to the at least two sub-models; obtaining, based on the operating probabilities corresponding to the at least two sub-models, a target probability about the target user operating the target item; and recommending the target item to the target user based on the target probability.

In addition, the RAM 503 may further store various programs and data required for operations of an apparatus. The CPU 501, the ROM 502, and the RAM 503 are connected to each other via the bus 504. In the presence of the RAM 503, the ROM 502 is an optional module. The RAM 503 stores executable instructions, or writes the executable instructions into the ROM 502 during running, where the executable instructions cause the processor 501 to execute corresponding operations of the foregoing method for deep learning-based recommendation. An Input/Output (I/O) interface 505 is also connected to the bus 504. The communication part 512 is integrated, or is configured to have multiple sub-modules (for example, multiple IB network cards) connected to the bus.

The following components are connected to the I/O interface 505: an input section 506 including a keyboard, a mouse and the like; an output section 507 including a Cathode-Ray Tube (CRT), a Liquid Crystal Display (LCD), a speaker and the like; the storage section 508 including a hard disk and the like; and a communication section 509 of a network interface card including an LAN card, a modem and the like. The communication section 509 performs communication processing via a network such as the Internet. A drive 510 is also connected to the I/O interface 505 according to requirements. A removable medium 511 such as a magnetic disk, an optical disk, a magneto-optical disk, a semiconductor memory or the like is mounted on the drive 510 according to requirements, so that a computer program read from the removable medium is installed on the storage section 508 according to requirements.

It should be noted that the architecture illustrated in FIG. 5 is merely an optional implementation mode. During specific practice, the number and types of the components in FIG. 5 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the scope of protection of the present disclosure.

Particularly, a process described above with reference to a flowchart according to the embodiments of the present disclosure is implemented as a computer software program. For example, embodiments of the present disclosure include a computer program product. The computer program product includes a computer program tangibly included in a machine-readable medium. The computer program includes a program code for performing a method shown in the flowchart. The program code may include instructions for performing steps of the method for deep learning-based recommendation provided in the embodiments of the present disclosure, for example, respectively obtaining related information of a target user and related information of a target item; respectively using at least two sub-models in an integrated model to obtain, based on the related information of the target user and the related information of the target item, operating probabilities corresponding to the at least two sub-models; obtaining, based on the operating probabilities corresponding to the at least two sub-models, a target probability about the target user operating the target item; and recommending the target item to the target user based on the target probability. In such embodiments, the computer program is downloaded and installed from the network through the communication section 509, and/or is installed from the removable medium 511. The computer program, when being executed by the CPU 501, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods, apparatuses, and devices in the present disclosure are implemented in many manners. For example, the methods, apparatuses, and devices in the present disclosure are implemented with software, hardware, firmware, or any combination of software, hardware, and firmware. The foregoing sequence of the operations of the method is merely for description, and unless otherwise stated particularly, the operations of the method in the present disclosure are not limited to the described sequence. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for deep learning-based recommendation, comprising:

obtaining related information of a target user and related information of a target item;

respectively using at least two sub-models in an integrated model to obtain, based on the related information of the target user and the related information of the target item, operating probabilities corresponding to the at least two sub-models, wherein the operating probability is used for indicating a probability, obtained based on one sub-model, about the target user operating the target item, and the integrated model comprises at least two sub-models;

obtaining, based on the operating probabilities corresponding to the at least two sub-models, a target probability about the target user operating the target item; and recommending the target item to the target user based on the target probability, wherein the obtaining, based on the operating probabilities corresponding to the at least two sub-models, a target probability about the target user operating the target item comprises:

respectively calculating products of the operating probabilities and model weight values of the sub-models corresponding to the operating probabilities, each model weight value corresponding to one sub-model; and adding the products corresponding to the at least two operating probabilities to obtain the target probability about the target user operating the target item.

2. The method according to claim 1, wherein the related information of the target user comprises: history information about a historical item being operated by the target user, the historical item comprising at least one item operated by the target user;

or, the related information of the target item comprises history information about the target item being operated by a historical user, the historical user comprising at least one user who operated the target item.

3. The method according to claim 1, wherein the respectively using at least two sub-models in an integrated model to obtain, based on the related information of the target user and the related information of the target item, operating probabilities corresponding to the at least two sub-models comprises:

using the sub-models to respectively vectorize the related information of the target user and the related information of the target item to obtain user vectors and item vectors; and obtaining the operating probabilities based on the user vectors and the item vectors.

4. The method according to claim 3, wherein the obtaining the operating probabilities based on the user vectors and the item vectors comprises:

calculating dot products of the user vectors and the item vectors to obtain operate values, and obtaining the operating probabilities based on the operate values.

5. The method according to claim 1, wherein the recommending the target item to the target user based on the target probability comprises:

in response to the target probability being greater than or equal to a preset threshold, recommending the target item corresponding to the target probability to the target user; and in response to the target probability being less than a preset threshold, recommending no target item corresponding to the target probability to the target user.

6. The method according to claim 1, wherein the integrated model is obtained by training a relation between at least two sub-models, and a training mode for the integrated model comprises: training the integrated model based on a historical user and a historical item, wherein a historical probability about the historical user operating the historical item is known.

7. The method according to claim 6, wherein the training the integrated model based on a historical user and a historical item comprises:

establishing a historical vector corresponding to the historical user and the historical item based on the historical user and the historical item;

decomposing, using the integrated model, the historical vector to obtain at least one sample user vector and at least one sample item vector;

obtaining a predicted probability based on the sample user vector and the sample item vector, the predicted probability indicating a probability about the historical user operating the historical item predicted by the integrated model; and training the integrated model based on the predicted probability and the historical probability.

8. The method according to claim 7, wherein the decomposing, using the integrated model, the historical vector to obtain at least one sample user vector and at least one sample item vector comprises:

decomposing, using an initial integrated model, the historical vector to obtain at least one sample user vector and at least one sample item vector, the initial integrated model comprising one sub-model.

9. The method according to claim 8, wherein the obtaining a predicted probability based on the sample user vector and the sample item vector comprises:

calculating, using the initial integrated model, a dot product of the sample user vector and the sample item vector to obtain a predicted value about the historical user clicking the historical item, and obtaining a predicted probability based on the predicted value.

10. The method according to claim 7, wherein the training the integrated model based on the predicted probability and the historical probability comprises:

allocating, according to a difference between the predicted probability and the historical probability, data weight values for the historical user and the historical item corresponding to the predicted probability, wherein the greater the difference is, the greater the data weight values are; and iteratively training the integrated model based on the sample user vector and the sample item vector combined with the data weight values.

11. The method according to claim 10, where the iteratively training the integrated model based on the sample user vector and the sample item vector combined with the data weight values comprises:

adding one sub-model to the initial integrated model to constitute a first integrated model;

calculating, using the first integrated model and in combination with the data weight values, a dot product of the sample user vector and the sample item vector to obtain a first predicted value about the historical user clicking the historical item, and obtaining a first predicted probability based on the first predicted value;

iterative executing: according to a first difference between the first predicted probability and the historical probability, allocating model weight values for the at least two sub-models in the first integrated model based on the first difference, and allocating first data weight values for the historical user and the historical item corresponding to the first predicted probability based on the first difference; and adding one sub-model to the first integrated model to constitute a second integrated model to substitute the first integrated model, using the second integrated model as the first integrated model, calculating, using the first integrated model and in combination with the first data weight values, a dot product of the sample user vector and the sample item vector to obtain a first predicted value about the historical user clicking the historical item, and obtaining a first predicted probability based on the first predicted value until satisfying a preset convergence condition.

12. The method according to claim 11, wherein the satisfying a preset convergence condition comprises:

the first difference between the first predicted probability and the historical probability is less than a preset difference.

13. An apparatus for deep learning-based recommendation, comprising:

a processor; and a memory for storing instructions executable by the processor, wherein the processor is configured to:

obtain related information of a target user and related information of a target item;

respectively use at least two sub-models in an integrated model to obtain, based on the related information of the target user and the related information of the target item, operating probabilities corresponding to the at least two sub-models, wherein the operating probability is used for indicating a probability, obtained based on one sub-model, about the target user operating the target item, and the integrated model comprises at least two sub-models;

obtain, based on the operating probabilities corresponding to the at least two sub-models, a target probability about the target user operating the target item; and recommend the target item to the target user based on the target probability, wherein the processor is further configured to:

respectively calculate products of the operating probabilities and model weight values of the sub-models corresponding to the operating probabilities, each model weight value corresponding to one sub-model, and add the products corresponding to the at least two operating probabilities to obtain the target probability about the target user operating the target item.

14. The apparatus according to claim 13, wherein the related information of the target user comprises: history information about a historical item being operated by the target user, the historical item comprising at least one item operated by the target user;

or, the related information of the target item comprises history information about the target item being operated by a historical user, the historical user comprising at least one user who operated the target item.

15. The apparatus according to claim 13, wherein the processor is further configured to:

use the sub-models to respectively vectorize the related information of the target user and the related information of the target item to obtain user vectors and item vectors; and obtain the operating probabilities based on the user vectors and the item vectors.

16. The apparatus according to claim 13, wherein the processor is further configured to:

in response to the target probability being greater than or equal to a preset threshold, recommend the target item corresponding to the target probability to the target user; and in response to the target probability being less than a preset threshold, recommend no target item corresponding to the target probability to the target user.

17. The apparatus according to claim 13, wherein the integrated model is obtained by training a relation between the at least two sub-models.

18. A non-transitory computer storage medium having stored thereon instructions that, when executed by a processor, cause the processor to perform operations of:

obtaining related information of a target user and related information of a target item;

respectively using at least two sub-models in an integrated model to obtain, based on the related information of the target user and the related information of the target item, operating probabilities corresponding to the at least two sub-models, wherein the operating probability is used for indicating a probability, obtained based on one sub-model, about the target user operating the target item, and the integrated model comprises at least two sub-models;

obtaining, based on the operating probabilities corresponding to the at least two sub-models, a target probability about the target user operates the target item; and recommending the target item to the target user based on the target probability, wherein the obtaining, based on the operating probabilities corresponding to the at least two sub-models, a target probability about the target user operating the target item, the instructions when executed by the processor, cause the processor to perform operations of:

respectively calculating products of the operating probabilities and model weight values of the sub-models corresponding to the operating probabilities, each model weight value corresponding to one sub-model; and adding the products corresponding to the at least two operating probabilities to obtain the target probability about the target user operating the target item.

* * * * *